Aug. 26, 1924.
T. MacRAE
1,506,495
SHOCK ABSORBER
Filed Sept. 27, 1921  2 Sheets-Sheet 1
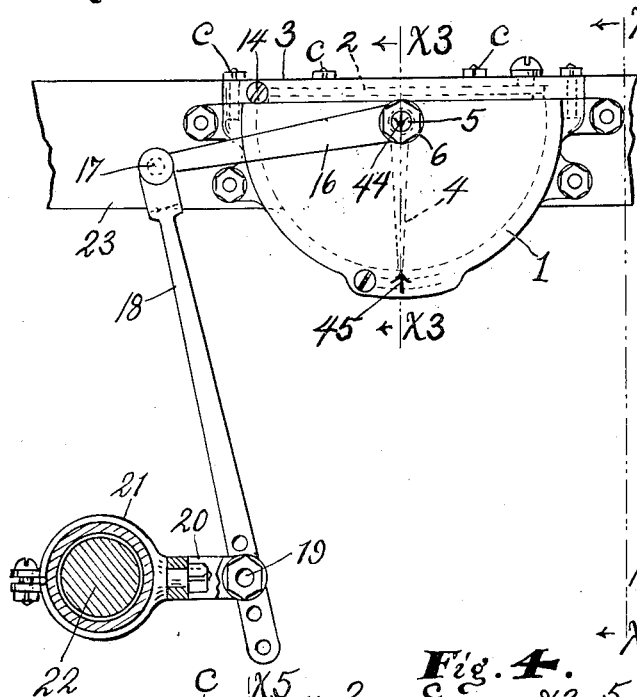
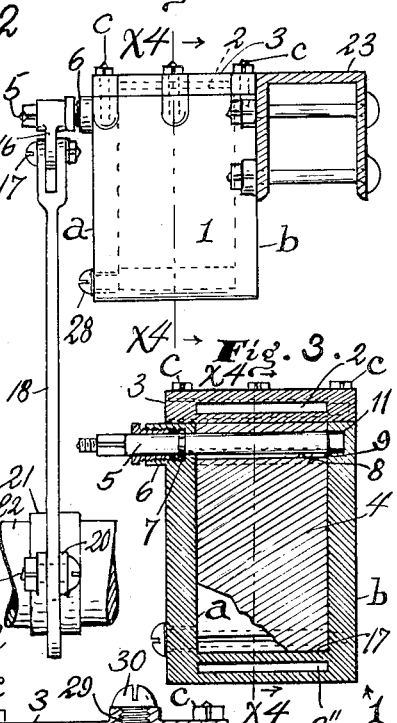
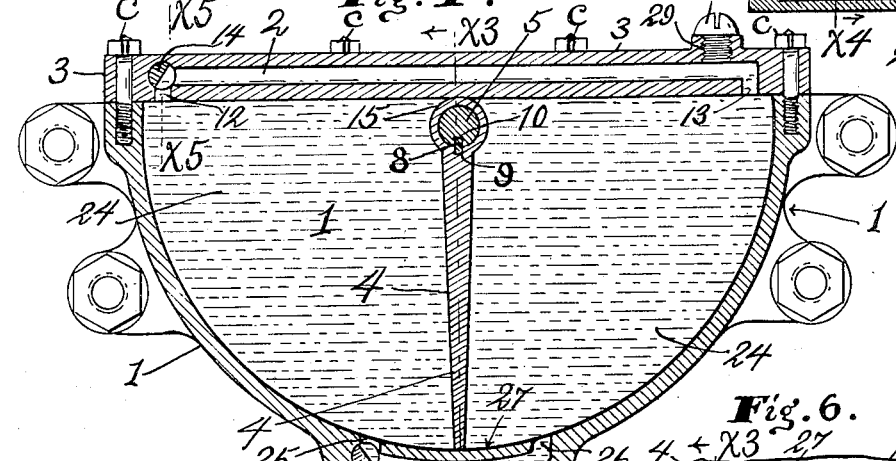
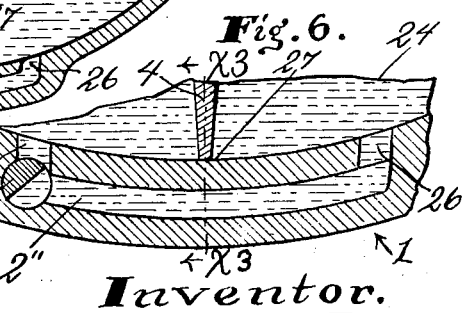
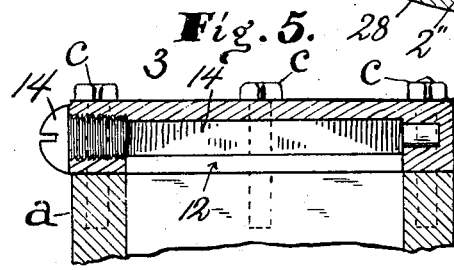
Inventor.
Thomas MacRae.
Witness:
W. M. Gentle.

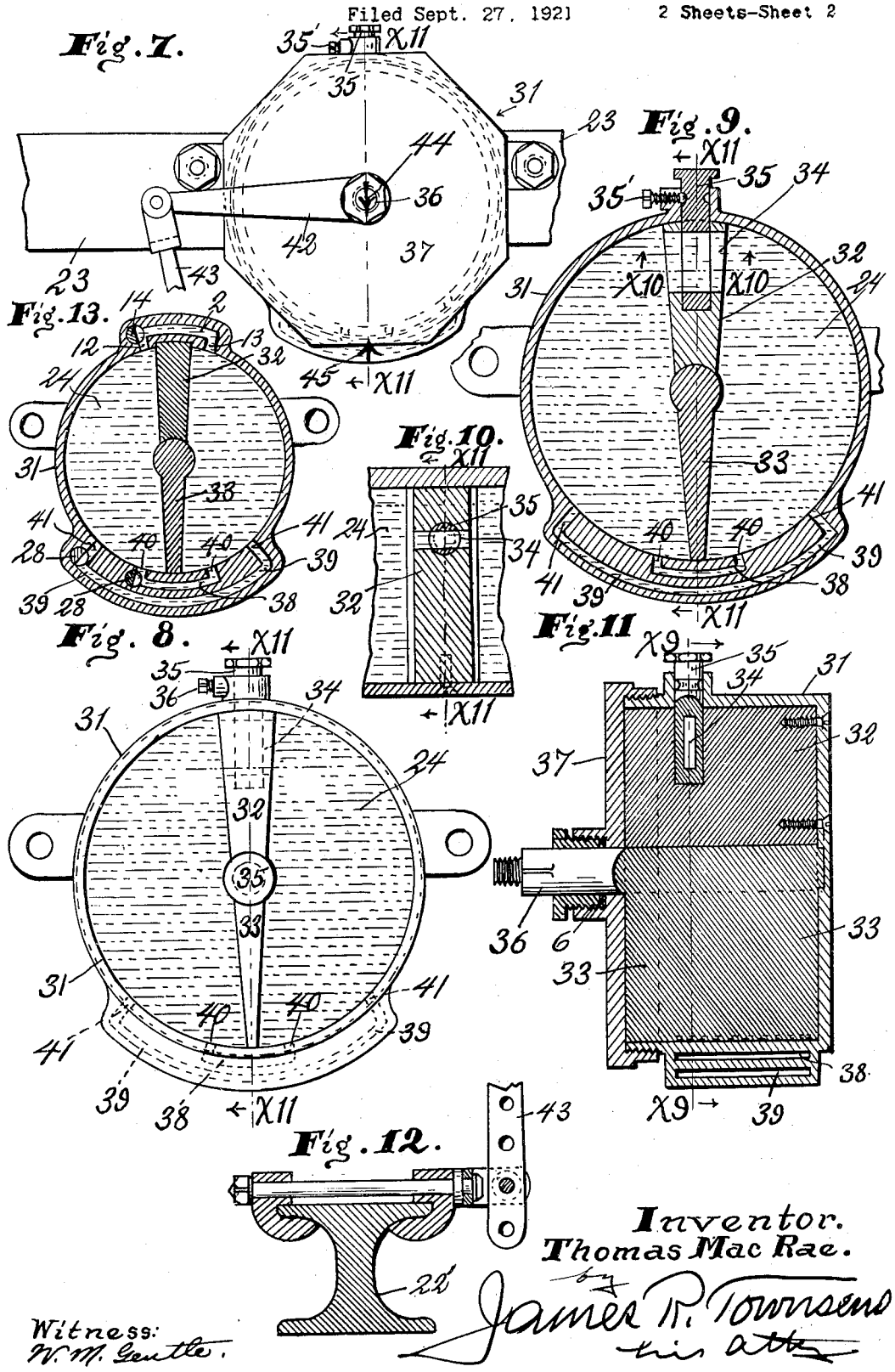

Patented Aug. 26, 1924.

1,506,495

UNITED STATES PATENT OFFICE.

THOMAS MacRAE, OF FLORENCE, ARIZONA.

SHOCK ABSORBER.

Application filed September 27, 1921. Serial No. 503,560.

*To all whom it may concern:*

Be it known that I, THOMAS MACRAE, a citizen of the United States, residing at Florence, in the county of Pinal and State of Arizona, have invented a new and useful Shock Absorber, of which the following is a specification.

An object of this invention is to provide a cheap, simple and effective shock absorber adapted to connect the frame and axle of a vehicle such as an automobile to prevent the excessive shock of thrust and rebound of the axle from reaching the frame, and also to avoid excessive action of the spring, and the consequent injury to which the vehicle springs are apt to be subjected.

This invention is broadly new, basic and pioneer in that I provide a shock absorber of the liquid resistance type having multiple regulatory means whereby the resistance at different portions of the relative movement of the separated parts may be separately controlled; and in this respect I have provided a multiple by-pass for the liquid, arranged to offer varying resistance to the movement of the piston at different stages of piston movement; and I supply one or more by-pass passages of different lengths, and means for varying the resistance through one or more of such passages.

An object is to make provision whereby the springs will be as free as desired in their intermediate operation and checked as desired at other parts of their movement.

Another object is to make provision whereby the resistance to thrust and recoil or rebound may be regulated throughout various stages.

Another object is to make practical provision for connecting the shock absorber to the frame and axle.

Another object is to provide the shock absorber with a practical pivotal connection to both axle and vehicle frame whereby it will adjust itself to side and end movement of the frame relative to the axle; in other words to move endwise or sidewise relative to its normal position above the axle; and the pivotal connections of the shock absorber or these parts are arranged to compensate for the changes of position.

An object is to provide means whereby the shock absorber can be readily set for practical operation.

I do not limit the invention to any specific application; for it is applicable to controlling the relative approach and recession of any two separated bodies where it is desired to retard, distribute or resist the application of force from one to the other.

The invention includes the use of unitary or multiple by-passes from one to the other side of the piston in a cylinder; and any number of by-pass passages required under various conditions may be applied; but the invention will be understood by illustrating the same with two by-pass passages.

Other objects, advantages and features of invention may appear from the accompanying drawings, the subjoined detail description and the appended claims.

The accompanying drawings illustrate the invention as it may be applied in two different forms.

Figure 1 is a side elevation of one form of the invention applied to an automobile frame and axle, fragments of which are shown.

Fig. 2 is an elevation of the same viewed from line $x^2$, Fig. 1.

Fig. 3 is a section on line indicated at $x^3$, Figs. 1, 4 and 6 on scale intermediate between Figs. 1 and 4.

Fig. 4 is an enlarged section on line $x^4$, Figs. 2 and 3.

Fig. 5 is an enlarged fragmental detail on line $x^5$, Fig. 4, showing one of the regulating valves.

Fig. 6 is an enlarged detail of the lower portion of Fig. 4, showing the regulating valves adjusted to retard movement of the piston throughout its intermediate movement.

Fig. 7 is a view of the outside of a shock absorber constructed to give wide range of movement of the piston.

Fig. 8 is a view of the device shown in Fig. 7 omitting the cap.

Fig. 9 is a section on line $x^9$, Fig. 11.

Fig. 10 is a section on line indicated at $x^{10}$, Fig. 9.

Fig. 11 is a section on line $x^{11}$, Figs. 7, 8, 9 and 10.

Fig. 12 is a view of the device shown in Fig. 7, for attachment to the front axle of an automobile.

Fig. 13 shows a construction embodying principles involved in the forms shown in Figs. 4 and 9.

The pistons I have employed are of the radial, oscillating or swinging type and the center of oscillation is at the center of an arcuate chamber, and its swinging edge cooperates with the inside wall of such chamber and said pistons may be of any width and length and form a partition from center to the arcuate wall and from end to end of the chamber.

In the form shown in Fig. 1 the circular chamber 1 having flat side walls a, b, is semicylindrical, and is provided with a by-pass bore 2 which is preferably formed in a cap 3 that is fixed to the chamber by stud bolts and nuts c.

The oscillating piston 4 separates the chamber into two compartments and is mounted upon a shaft 5 that extends through a stuffing box 6 on one side of the chamber; said shaft being held in place by shoulder 7 inside the stuffing box, and the piston being fixed against rotation on the shaft by a key 8 which is seated in the key-way 9 in the piston and in the groove 10 in the shaft which is stepped at 11 into the inner side of the wall b of the chamber. The by-pass 2 extends longitudinally of the cap and opens into the chamber throughout ports 12, 13, one of which is controlled by a suitable valve 14 that is shown as a cylinder having one half cut away for a distance equal to the length of the ports between the walls of the chamber.

The cylindrical butt or eye of the piston is preferably journalled in a bearing 15 formed on the inside of the cap or walls of the chamber to make a practically liquid-tight closure between the limbs of the chamber which are separated from each other by the piston. The rock shaft 5 is connected to power transmitting means as the rock arm 16 which is connected by a pin 17 to a connecting rod 18 that is connected by a bolt 19 to a swivel 20 on a clamp 21 that is adapted to clamp the swivel to one of the separated bodies as the axle 22. By this arrangement the rock shaft 5 will be rocked by the relative approach of the two parts as the axle 22 and frame 23 of the automombile, thus oscillating the piston 4 in chamber 1. In practical use the chamber will be filled by a liquid pressure-transmitting medium 24 which may be glycerine or any other liquid adapted to flow through the by-pass in response to the oscillation of the piston.

In order that the piston may oscillate with greater freedom responsive to the initial relative movement of the axle and frame, viz, parts 22 and 23, the by-pass means connecting the limbs of the chamber on the opposite sides of the piston, is multiform and one passage as at 2″ is shorter than the main passage 2 and is arranged with its ports 25, 26 on opposite sides of the middle of the segmental floor 27 of the chamber, so that when the piston is held at rest in its normal position that is established by the vehicle springs, not shown, it will be mid-way between the ports 25, 26, and can oscillate from that position to either one of the ports with an ease of movement predetermined by the combined cross-sectional area of both the short and long passage. As soon as the piston passes either one of the ports 25, or 26, the resistance is determined by the cross-sectional area of the ports 12 and 13 of the passage 2 as controlled by the valve 14. The by-pass passage 2″ may likewise be controlled by a valve 28 corresponding in form and function to the regulating valve 14.

In assembling the device the piston with the spline 10 in place will be inserted into the chamber and the shaft will then be inserted with its groove in position to receive the spline. Then the cap will be secured in place, the packing of the stuffing box will be applied and the gland screwed home.

Then the liquid medium 24 will be introduced into the chamber through the filling orifice 29, which is then closed by the screw plug 30. The orifice opens into the by-pass 2.

It is important in the usual installing of the device that the piston be set with its ends between the ports of the intermediate by-pass passage, and to aid in positively determining the position of the piston relative to the shaft, the shaft is provided with an index mark 44 and the body of the cylinder is provided with an index mark 45 and these marks are so placed that when the piston is in the appropriate position as shown in Fig. 4 the marks will point toward each other as shown in Fig. 1.

The form shown in Figs. 1, 2, 3 and 4 is regarded as a practical construction for shock absorbers adapted to be used on automobiles and for like purposes in which the range of movement of the parts is toward and from a plane extending between said parts. Where the range is greater the movement can be accommodated by the construction shown in Figs. 7-11 and 13 and such construction is preferable in some respects for easy manufacture.

In Figs. 7-11 the cylindrical chamber 31 is separated into two compartments by a depending extension 32 of the chamber walls and is of narrow limits and the piston 33 may have a movement throughout an arc greater than 180 degrees. The main by-pass passage 34 is controlled by a valve 35 which may be fixed in set position by any suitable means as the set screw 35′. The piston 33 is fixed to the shaft 36 that extends through the cap 37 that is screwed onto the open end of the chamber 31. The cylindrical butt of the piston 33 is journalled in the bearing 15 formed in the depending extension 32 of the walls of the cylinder to make a practically liquid-tight closure between the chamber walls and the cylindrical butt of the piston. The chamber 31 is also provided with by-pass passages indicated at 38 and 39, the ports 40 of the passage 38 being arranged in a limited arc and the ports 41 of the passage 39 being in a wider arc so that the resistance to the movement of the piston will increase as the piston approaches either side of the partition 32.

Valves for controlling the by-passes 38 and 39 are not shown in Fig. 8 and it is understood that valves may be applied to or may be omitted from any of the by-pass passages or bores employed.

Any suitable force transmitting means may be connected to the shaft 36 as indicated by the arm 42 and connecting rod 43.

The operation of both forms of the device shown is practically the same in each instance when connected as indicated, and the axle 22 or 22' and the frame 23 approach or recede from each other as the piston is oscillated.

In Fig. 13 I have shown a preferred form of this invention in which the by-pass 2 extends around the bearing for the piston that is formed in the cylinder walls and the ports 12, 13 of each by-pass connect the two compartments which are separated from each other by the piston.

I claim:

1. A shock absorber comprising a cylinder and piston operating therein, said cylinder being provided with by-pass bores of different lengths, said bores communicating with the chamber of the cylinder on opposite sides of the piston under ordinary conditions, said piston being adapted to pass a port of one of said bores when the shock absorber is subjected to greater shocks.

2. A shock absorber comprising a cylinder and a piston operating therein, said cylinder being provided with by-pass bores of different lengths, said bores communicating with the chamber of the cylinder on opposite sides of the piston under ordinary conditions, said piston being adapted to pass a port of one of said by-passes when the shock absorber is subjected to greater shocks; and means for controlling the liquid flow through one or more of said bores.

3. The combination with a chamber, of an oscillating piston in said chamber; a fluid resisting-medium in the chamber; said piston separating said chamber into two compartments; by-pass means connecting said compartments and comprising ports one or more of which are adapted to be passed by said piston; and means for restricting the flow through said by-pass means.

4. A shock absorber comprising a chamber; a piston separating said chamber into two compartments and a multiple passage by-pass connecting said compartments; one of the passages of said by-pass being arranged to connect the compartments during a predetermined movement of the piston, and another passage of said by-pass being operative throughout a greater range of movement of the piston.

5. A shock absorber comprising a chamber, a piston separating said chamber into two compartments and a multiple passage by-pass connecting the compartments, one of said passages being arranged to operate during a predetermined movement of the piston, and the other passage being operative throughout a greater range of movement of the piston; and means for restricting the flow through one or both of said passages.

6. A shock absorber comprising a semi-cylindrical chamber; an oscillating piston in said chamber; a plurality of by-pass passages communicating with said chamber and adapted respectively to by-pass liquid from one to the other side of the piston, the ports of one of said by-passes being adapted to afford communication between the compartments on opposite sides of the chamber throughout the complete oscillation of the piston, and one or more other by-passes having ports arranged to communicate with the chamber on both sides of said piston throughout only a portion of the movement of said piston.

7. The combination with a cylinder, of a piston movable in said cylinder and journalled in the walls of said cylinder; a liquid resisting medium in said cylinder; a by-pass in said cylinder having ports communicating with the interior of the cylinder on opposite sides of the piston throughout the complete movement of the piston; and other by-passes having ports arranged to communicate with the interior of the cylinder on both sides of the piston throughout only a portion of the movement of said piston.

8. A shock absorber comprising a cylinder and a piston operating therein and journalled in the cylinder walls; said piston separating the cylinder into two compartments; and by-pass means extending around the journal of the piston in one of the cylinder walls and having ports communicating with the compartments on opposite sides of the piston.

9. A shock absorber comprising a cylinder; an oscillating piston in said cylinder; by-pass means communicating with the interior of the cylinder on opposite sides of the piston; and means to connect the piston and cylinder respectively with elements having movement relative to each other.

10. A shock absorber comprising a cylinder having a bearing formed in one of its walls; a piston operable in said cylinder and journalled in said bearing; a by-pass extending around said bearing and having ports communicating with the interior of the cylinder on opposite sides of the piston; and other by-passes having ports communicating with the interior of the cylinder on opposite sides of the piston under ordinary conditions, said piston being adapted to pass ports of said other by-passes when the shock absorber is subjected to greater shocks.

11. A shock absorber comprising a cylinder, an oscillating piston in said cylinder; a by-pass having ports communicating with the interior of the cylinder on opposite sides of the piston at any position of the piston; a liquid resisting medium in said cylinder and said by-pass; and means to operate said piston for the purpose specified.

12. A shock absorber comprising a cylinder, an oscillating piston in said cylinder; a by-pass having ports communicating with the interior of the cylinder on opposite sides of the piston at any position of the piston; a liquid resisting medium in said cylinder and said by-pass; means to control the flow of liquid through said by-pass; and means to operate said piston for the purpose specified.

In testimony whereof, I have hereunto set my hand at Los Angeles, California, this 21st day of September, 1921.

THOMAS MacRAE.

Witness:
JAMES R. TOWNSEND.